United States Patent
Siperstein et al.

(10) Patent No.: US 10,837,877 B2
(45) Date of Patent: Nov. 17, 2020

(54) SAMPLING SYSTEM WITH IN-LINE TEMPERATURE MEASUREMENT AND CONTOL

(71) Applicant: Ohio Lumex Co., Inc., Cleveland, OH (US)

(72) Inventors: Joseph Siperstein, Chagrin Falls, OH (US); Adam Rych, Durham, NC (US); Andrew Mertz, Mantua, OH (US)

(73) Assignee: Ohio Lumex Co., Inc., Cleveland, OH (US)

( * ) Notice: Subject to any disclaimer, the term of this patent is extended or adjusted under 35 U.S.C. 154(b) by 204 days.

(21) Appl. No.: 16/160,364

(22) Filed: Oct. 15, 2018

(65) Prior Publication Data

US 2019/0113421 A1     Apr. 18, 2019

Related U.S. Application Data

(60) Provisional application No. 62/573,233, filed on Oct. 17, 2017.

(51) Int. Cl.
*G01N 1/22* (2006.01)

(52) U.S. Cl.
CPC ......... *G01N 1/2214* (2013.01); *G01N 1/2247* (2013.01); *G01N 2001/2282* (2013.01); *G01N 2001/2285* (2013.01)

(58) Field of Classification Search
CPC ................ G01N 1/2214; G01N 2001/2285
See application file for complete search history.

(56) References Cited

U.S. PATENT DOCUMENTS

| | | | |
|---|---|---|---|
| 7,614,315 B2 | 11/2009 | Moore | |
| 7,802,485 B2* | 9/2010 | Wright | G01N 1/2214 73/863.11 |
| 7,998,731 B2* | 8/2011 | Daitch | G01N 1/2273 435/287.4 |
| 2009/0084198 A1 | 4/2009 | Wright et al. | |
| 2009/0084199 A1 | 4/2009 | Wright et al. | |
| 2010/0206093 A1 | 8/2010 | Wright et al. | |

* cited by examiner

*Primary Examiner* — Justin N Olamit
(74) *Attorney, Agent, or Firm* — Renner, Otto, Boisselle & Sklar, LLP

(57) ABSTRACT

A sampling system including a probe having at least one sorbent trap disposed in a fluid passage that receives and delivers a sample gas, and an in-line temperature measurement located within the fluid passage of the probe. The in-line temperature measurement may be provided by a temperature measurement device having a thermal sensing portion located proximate to, or at, the sorbent trap for providing a more accurate temperature measurement of the trap during sampling of the gas. The sampling system includes a controller configured to receive a signal corresponding to the temperature measured by the thermal sensing portion within the fluid passage, in which the controller may be configured to control the temperature of the sorbent trap based upon the temperature signal.

20 Claims, 2 Drawing Sheets

SAMPLING SYSTEM WITH IN-LINE TEMPERATURE MEASUREMENT AND CONTOL

RELATED APPLICATIONS

This application claims the benefit of U.S. Provisional Application No. 62/573,233 filed Oct. 17, 2017, which is hereby incorporated herein by reference in its entirety.

TECHNICAL FIELD

The present disclosure relates generally to a sampling system, and more particularly to a sampling system utilizing a sorbent trap for environmental gas testing.

BACKGROUND

Sorbent traps are commonly used to quantify pollutants in combustion gas. When gas samples are taken, the sorbent traps typically are inserted into a probe and placed directly into the combustion gas. The sample gas is pulled through the sorbent traps across a sorbent material, and the volume of the sample gas is measured. The sorbent material is then analyzed for the captured mass of the analyte of interest. The analyte concentration in the sample can then be expressed in terms of mass/volume.

An important consideration during the sampling of the gas is the temperature of the sorbent traps. If the sorbent trap temperature is too cold, condensed water can collect inside the trap and cause invalidation of the test. If the sorbent trap temperature is too hot, the analyte may not be effectively retained by the sorbent material, or the sorbent material may melt. Therefore, typical sorbent traps will utilize a heater or chiller to heat or cool the sorbent trap, and will utilize a thermocouple for measurement and control of the sorbent trap temperature.

Current temperature measurement techniques for sorbent traps locate the thermocouple inside the sorbent trap probe. However, in these current designs the thermocouple is not in direct contact with the sorbent traps or the sample gas. Instead, the sorbent trap is contained inside an airtight liner that runs through the inside of the probe, and the thermocouple is located outside of this liner. Therefore, such current designs do not take into account the temperature gradient between the thermocouple location and the heater, and instead rely on the assumption that the two temperatures will be equal. This, in turn, causes discrepancies between the actual temperature and the desired temperature of the sorbent trap. Such discrepancies may be exacerbated if a cooling air flow is used to cool the liner surrounding the trap, whereby the thermocouple is exposed to this cooling flow and causes a larger difference between the measured and actual temperature of the sorbent trap. Some sorbent trap techniques are particularly sensitive to temperature and require tight temperature control to be performed correctly. Thus, a need exists for improved temperature measurement and/or temperature control of the sorbent trap during sampling.

SUMMARY

The present disclosure provides a sampling system including a probe having at least one sorbent trap disposed in a fluid passage that receives and delivers a sample gas, and an in-line temperature measurement located within the fluid passage of the probe. The in-line temperature measurement may be provided by a temperature measurement device having a thermal sensing portion located proximate to, or at, the sorbent trap for providing improved temperature measurement and/or temperature control of the trap during sampling of the gas.

According to one aspect of the present disclosure, a probe for obtaining a gaseous sample from a gas stream includes: a housing; a fluid passage extending through the housing between an upstream inlet opening for ingress of the gaseous sample from the gas stream into the fluid passage, and a downstream outlet opening for egress of the gaseous sample from the fluid passage; a sorbent material disposed within the fluid passage between the upstream inlet opening and the downstream outlet opening; and a temperature measurement device having a thermal sensing portion located within the fluid passage between the upstream inlet opening and the downstream outlet opening; wherein the temperature measurement device is configured to measure a temperature within the fluid passage via the thermal sensing portion.

Embodiments according to the present disclosure may include one or more of the following additional features separately or in any combination.

For example, the thermal sensing portion may be located downstream of an upstream edge of the sorbent material.

The thermal sensing portion may be in direct thermal contact with the gaseous stream proximate to the sorbent material.

The thermal sensing portion may be at a downstream portion of the sorbent material.

The fluid passage may be at least partially formed by a conduit extending through the housing.

The temperature measurement device may be inserted into the conduit through a leak-tight fitting that is operatively coupled at a downstream portion of the housing.

An upstream end portion of the conduit may include the upstream inlet opening of the fluid passage, the upstream end portion of the conduit extending outwardly from a front face of the housing such that the inlet opening is spaced from the front face of the housing and is configured for placement directly into the gas stream.

The upstream end portion of the conduit may be sealed against the front face of the housing with a compression fitting.

At least a portion of the conduit may be configured as a multi-walled tube, the multi-walled tube having a radially inner portion that contains the sorbent material and a radially outer portion that jackets the radially inner portion along an axial length thereof.

The radially inner portion of the multi-walled tube may be configured as a removable sorbent trap insert containing the sorbent material, and the radially outer portion of the multi-walled tube may be configured as a liner coupled to the housing.

The sorbent trap insert may be slidably inserted into an upstream portion of the liner when in an installed position, in which a downstream end of the sorbent trap insert terminates at a partial axial length of the liner such that the sorbent material is surrounded by the housing, and wherein the sorbent trap insert is configured to be removable from the liner and the probe. When the sorbent trap insert is in the installed position in the liner, the thermal sensing portion of the temperature measurement device may be located within the liner at a position downstream of the downstream end of the sorbent trap insert.

The temperature measurement device may be a thermocouple, and the thermal sensing portion may be a thermal couple junction.

The temperature measurement device may be a pyrometer configured to generate a beam, and the thermal sensing portion may be a surface upon which the beam impinges.

The probe may further include a heater in thermal communication with the sorbent material.

The probe may further include a chiller in thermal communication with the sorbent material.

A sampling system includes the probe having one or more of the foregoing features, and also includes a sampling unit operatively coupled to the fluid passage, the sampling unit being configured to measure at least one property of the gaseous sample.

The sampling unit may include a controller operatively coupled to the temperature measurement device for receiving a signal corresponding to the measured temperature.

The controller may be operatively coupled to a heater, and may be configured to control heating via the heater based upon the signal corresponding to the measured temperature.

The controller may be operatively coupled to a chiller, and may be configured to control cooling via the chiller based upon to the signal corresponding to the measured temperature.

The sampling unit further include a pump and a volume measuring device.

The pump may be fluidly connected to the fluid passage of the probe, and is configured to draw the gaseous sample from the upstream inlet opening, across the sorbent material, and toward the pump.

The volume measuring device is configured to measure a volume of the gaseous sample.

According to another aspect of the present disclosure, a sampling system for obtaining a gaseous sample from a gas stream includes: a probe having a housing with a sorbent trap at least partially disposed therein, the sorbent trap defining at least a portion of a fluid passage extending through the housing between an upstream inlet opening and a downstream outlet opening, the upstream inlet opening configured for ingress of the gaseous sample from the gas stream into the fluid passage, and the downstream outlet opening configured for egress of the gaseous sample from the fluid passage, wherein the sorbent trap includes a sorbent material disposed within the fluid passage between the upstream inlet opening and the downstream outlet opening; a temperature measurement device having a thermal sensing portion located within the fluid passage, such that the temperature measurement device is configured to measure a temperature within the fluid passage; a heater and/or a chiller in thermal communication with the sorbent material; and a controller operatively coupled to the temperature measurement device and operatively coupled to the heater and/or chiller; wherein the controller is configured to receive a signal from the temperature measurement device corresponding to the temperature measured within the fluid passage; and wherein the controller is configured to control heating via the heater and/or control cooling via the chiller based upon the received signal.

In exemplary embodiments, the sorbent trap is a first sorbent trap, and the probe further includes a second sorbent trap disposed in the housing.

The following description and the annexed drawings set forth certain illustrative embodiments according to the present disclosure. These embodiments are indicative, however, of but a few of the various ways in which the principles according to the disclosure may be employed. Other objects, advantages and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects according to the present disclosure.

DETAILED DESCRIPTION

The principles of the present disclosure have particular application to sampling systems that utilize sorbent traps for environmental gas testing, and thus will be described below chiefly in this context. It is also understood, however, that the principles and aspects according to the present disclosure may be applicable to other applications or systems where it is desirable to provide improved temperature measurement and/or temperature control of a sorbent trap used to capture an analyte of interest from a fluid stream.

Figure 1:
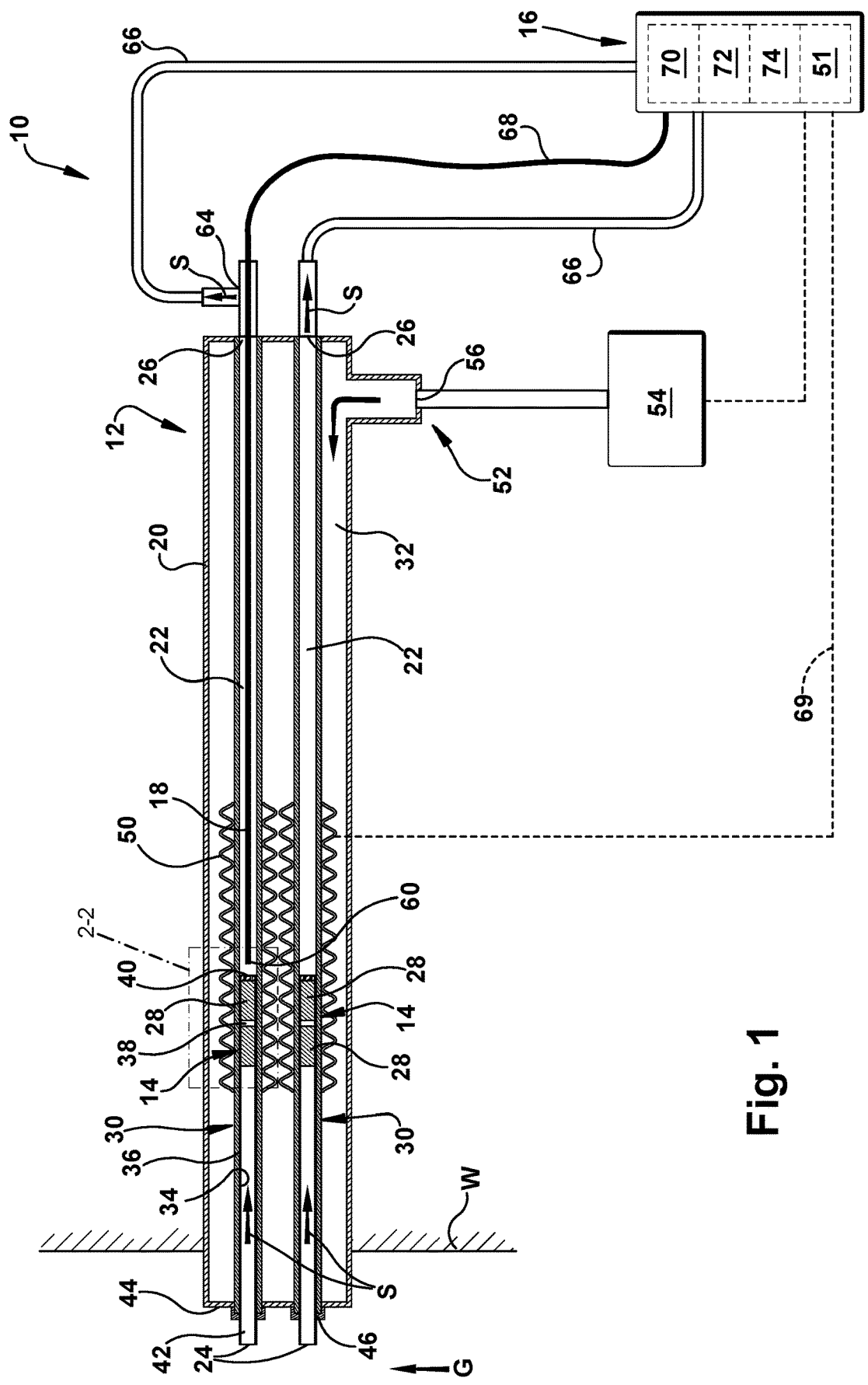
FIG. 1 is a schematic cross-sectional side view of an exemplary sampling system according to an embodiment of the present disclosure, including an exemplary sampling probe and sampling unit.
Figure 2:
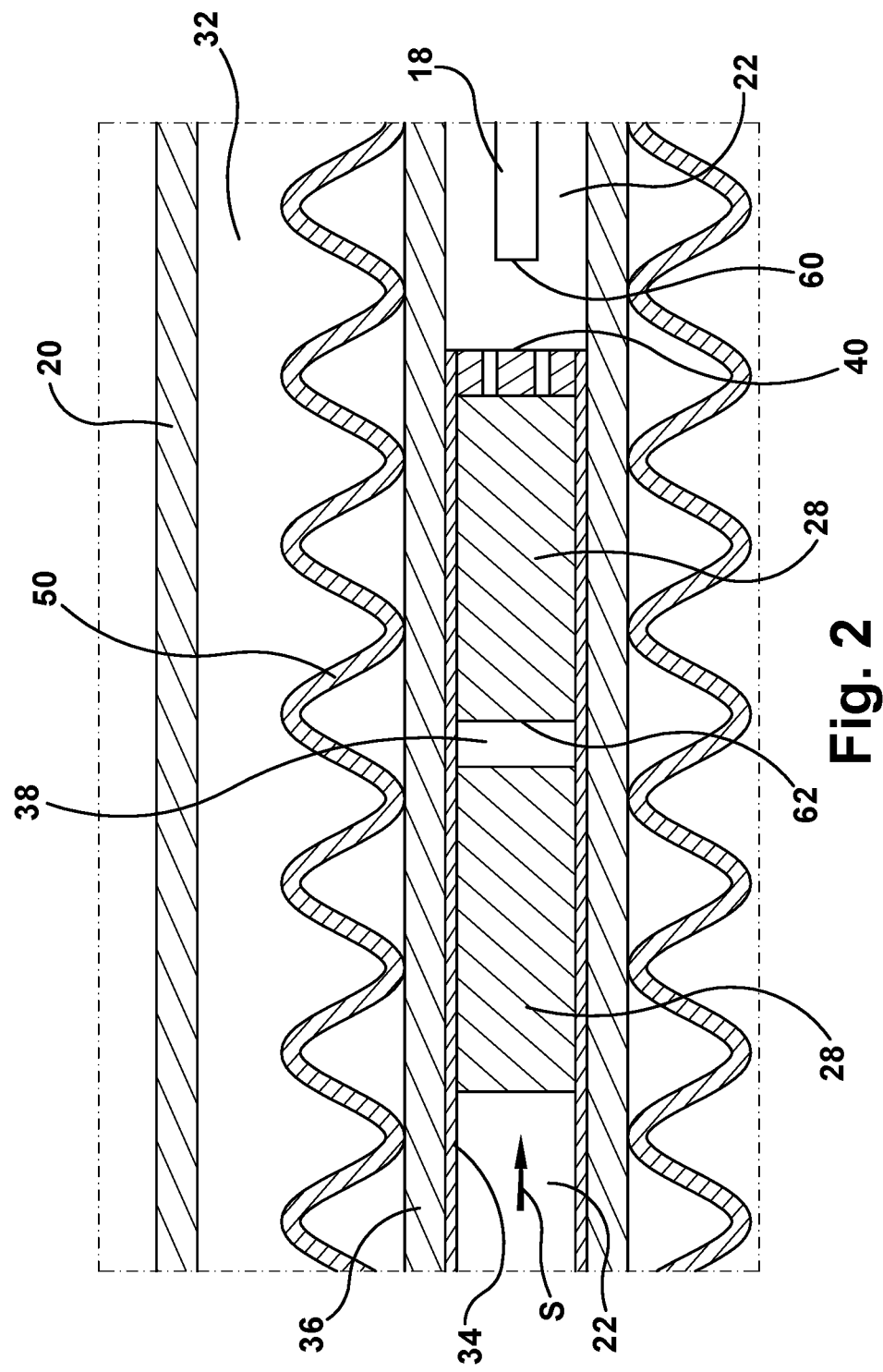
FIG. 2 is an enlarged view of section 2-2 in FIG. 1.

Referring to FIGS. 1 and 2, an exemplary sampling system 10 for obtaining a gaseous sample "S" from a gas stream "G" is shown. The sampling system 10 generally includes a probe 12 with one or more sorbent traps 14 for capturing the sample gas S from the gas stream G, and a sampling unit 16 operably coupled to the probe 12 for measuring one or more properties of the sample gas S. As described in further detail below, the exemplary sampling system 10 also includes a temperature measurement device 18 that is configured to provide an in-line temperature measurement within the sample gas stream S, in which this measured temperature may then be utilized to provide improved temperature control of the sorbent trap 14.

As shown, the probe 12 includes a housing 20 and one or more fluid passages 22 that extend through the housing 20 between an upstream inlet opening 24 for ingress of the gaseous sample S from the gas stream G into the fluid passage 22, and a downstream outlet opening 26 for egress of the gaseous sample S from the fluid passage 22. The housing 20 of the probe may extend through a manifold or wall "W" of a flue or other channel carrying the gas stream G, such that the end of the probe 12 makes direct contact with the gas stream G for drawing the sample gas S through the fluid passage(s) 22 of the probe 12. Generally, the housing 20 may have a cylindrical construction with a rigid exterior wall formed of a suitable material for withstanding the environmental effects of the gas stream G, such as being made of stainless steel, or the like.

As shown in the illustrated embodiment, the one or more sorbent traps 14 are at least partially disposed within the housing 20. Each sorbent trap 14 includes one or more sections of sorbent material 28 that are configured to capture a mass of an analyte of interest within the sample gas S. In exemplary embodiments, each sorbent trap 14 defines at least a portion of each fluid passage 22. In this manner, the sample gas S may be drawn into the inlet opening 24, through the sorbent trap 14 and across the sorbent material 28 where the analyte is captured, and then the sample gas S is carried downstream through the outlet opening 26 of the probe 12 toward the sampling unit 16 where the volume or other properties of the sample gas S are measured.

In exemplary embodiments, at least a portion of the one or more fluid passages 22 extending through the housing 20 may be formed by one or more fluid conduits 30 operatively coupled to the housing 20. The fluid conduits 30 are operatively coupled to the housing 20 in a leak-tight manner to prevent the sample gas S from leaking into an annulus 32 of the housing 20. The fluid conduits 30 may be spaced apart within the housing 20, and the annular gap between the conduits 30 may be configured as an air gap, or may be filled with suitable insulation material. Generally, the fluid conduits 30 may extend along a longitudinal axis of the housing 20 between opposite ends of the housing 20, and may extend beyond one or more of the ends of the housing 20, as shown.

In the illustrated embodiment, each of the fluid conduits 30 is configured as a multi-walled tube (also referred to with reference numeral 30), which has a radially inner portion 34 and a radially outer portion 36. As shown, the radially inner portion 36 of the multi-walled tube 30 is formed by a tubular portion of the sorbent trap 14, and the radially outer portion 36 of the multi-walled tube 30 is formed by a liner that jackets and protects the sorbent trap 14. In exemplary embodiments, the liner (also referred to with reference numeral 36) is a rigid tube made of any suitable material, such as stainless steel, or the like. The liner 36 may be operatively coupled to the housing 20 by any suitable means to provide a leak-tight seal, such as by welding, brazing, threading, or the like; or the liner 36 may be integrally formed with the housing 20. The tubular portion of the sorbent trap (also referred to with reference numeral 34) may be made of glass, and is configured to contain the one or more sections of sorbent material 28. As shown, each section of the sorbent material 28 may be separated by divider(s) 38. The sorbent trap material 28 may be any suitable material for capturing the analyte of interest, which may be selected in a well-known manner as understood by those having ordinary skill in the art.

In exemplary embodiments, the sorbent trap 14 is configured as a removable sorbent trap insert (also referred to with reference numeral 14) that is configured to be slidably inserted into an upstream portion of the liner 36 (shown in an installed position in FIG. 1, for example) To facilitate removal of the sorbent trap insert 14 for analyzing the sorbent material 28 and/or analyte of interest, the sorbent trap insert 14 is configured to be removable from the probe 12 with the liner 36 remaining fixed in position within the housing 20. As shown in the illustrated embodiment, when the sorbent trap insert 14 is in the installed position (FIG. 1), a downstream end 40 of the sorbent trap insert 14 terminates at a partial axial length of the liner 36 such that only an upstream portion of the liner 36 surrounds the sorbent trap insert 14. The downstream end 40 of the sorbent trap insert 14 may have an axial end wall that restricts movement of the sorbent material 28, and may have openings in the end wall to permit flow of the sample gas S through the trap 14. It is understood that although the sorbent trap insert 14 is shown as being inserted along a partial length of the liner 36, the sorbent trap insert 14 also could extend along a majority of the length, or along the entire axial length, of the liner 36. It is also understood that the liner 36 could be configured for removal from the housing 20, and/or that the conduit 30 may include fewer tubular walls (e.g., one), or more tubular walls (e.g., three or more), as may be desirable for particular applications.

In the illustrated embodiment, an upstream end portion 42 of the sorbent trap 14 (e.g., conduit 30) extends outwardly from a front face 44 of the housing 20, such that the inlet opening 24 is spaced from the front face 44 of the housing and is configured for placement directly into the gas stream G. An upstream end portion of the liner 36 also may project from the front face 44 of the housing 20, and a suitable fitting 46 may be utilized to seal the conduit 30 (e.g., liner 36 and/or sorbent trap insert 14) against the front face 44 of the housing. In exemplary embodiments, the fitting 46 may be a compression fitting, such as a ferrule and nut assembly that operates in a well-known manner. In such a configuration, the housing 20 may have a threaded nipple attached to its front face 44, through which the conduit 30 extends, and the ferrule and nut assembly may cooperate with the nipple and conduit 30 to provide the compression seal.

In exemplary embodiments, the probe 12 further includes at least one heater 50 that is in thermal communication with the sorbent trap 14, and more particularly the sorbent material 28. In the illustrated embodiment, the heater 50 is contained within the housing 20, and is configured to surround each and/or both of the fluid conduits 30 (including liner 36 and sorbent trap insert 14) proximate to the sorbent material 28. In this manner, the heater 50 may be utilized to heat the sorbent trap 14 and/or sorbent material 28 to reduce the likelihood of condensation in the trap, and to enhance the retention of analyte by the sorbent material 28 in the trap 14. In exemplary sorbent trap techniques, the heater 50 may heat the sorbent trap 14 to a temperature in the range from about 50° C. to about 350° C., or more. The heater 50 may be any suitable heater, such as an electrical heater (e.g., cartridge, block, coil, etc.), fluid-operated heater, or the like. As shown, the heater 50 is operatively coupled to a source 51, such as an electrical power source, which may be provided as part of the sampling unit 16, or the source 51 may be operatively coupled to the sampling unit 16.

In exemplary embodiments, the probe 12 also may include at least one chiller 52 that is in thermal communication with the sorbent trap 14, and more particularly the sorbent material 28. The chiller 52 may be utilized to cool the sorbent trap 14 and/or sorbent material 28 to reduce the likelihood of melting the sorbent material 28, and also may be utilized to cool the probe housing 20. The chiller 52 may be any suitable chiller, such as a fluid-operated chiller, an electrical chiller, or the like, which is operatively coupled to a source 54, such as a fluid or electrical source. The source 54 may be provided as part of the sampling unit 16, or may be operatively coupled to the sampling unit 16. In the illustrated embodiment, the chiller 52 is a fluid-operated chiller that is formed by a coolant flow path in the housing 20, in which coolant (e.g., air) from the source 54 (e.g., ambient environment) enters the housing 20 through an inlet port 56, and then flows through the annular gap 32 of the housing 20 (or other suitable channels) to provide cooling to the sorbent trap 14 via the liner 36.

As discussed above, the sampling system 10 also includes the temperature measurement device 18 that is configured to provide in-line temperature measurement from within the fluid passage 22 extending through the housing 20. More particularly, the temperature measurement device 18 has a thermal sensing portion 60 located within the fluid passage 22 that is configured to directly measure the temperature of the sample gas S (and/or sorbent material 28) via direct thermal contact from within the fluid passage 22.

In exemplary embodiments, the temperature measurement device 18 includes a thermocouple wire disposed within the fluid conduit 30, in which a thermocouple junction of the wire provides the thermal sensing portion 60. The thermocouple wire may be utilized for both low and high temperature applications, and provides accurate measurement while also providing ease of assembly and low cost. It is understood, however, that other suitable temperature measurement devices may be utilized. For example, the temperature measurement device 18 may include a pyrometer, such as an infrared pyrometer, in which case the thermal sensing portion 60 would be the end of the infrared beam that impinges a surface to be measured (e.g., the sorbent trap insert 14 or sorbent material 28, for example). Such a pyrometer could be installed at the downstream end of the probe 12 in a similar manner as the thermocouple wire. Other types of temperature measurement devices also may be utilized to measure the temperature within the fluid passage 22, as would be understood by those having ordinary skill in the art.

In exemplary embodiments, the thermal sensing portion 60 of the temperature measurement device 18 is located proximate to, or at, the sorbent trap 14 and/or sorbent material 28 for providing a temperature measurement that accurately represents the actual temperature of the sorbent trap 14 and/or sorbent material 28. For example, the thermal sensing portion 60 may be thermally proximate to the sorbent trap 14 and/or sorbent material 28 to measure a temperature within 25° C., or more particularly less than 5-15° C., of the actual sorbent trap and/or sorbent material temperature. Additionally or alternatively, the thermal sensing portion 60 may be positionally proximate to the sorbent trap 14 and/or sorbent material 28 to accurately measure the sorbent trap and/or sorbent material temperature, such as being spaced apart by a distance of 25 mm or less, or more particularly spaced apart by 5 mm or less, from the sorbent trap 14 and/or sorbent material 28; or the thermal sensing portion 60 may contact the sorbent trap 14. Such configuration(s) provide accurate measurement of the sample gas temperature near the sorbent trap 14 and/or sorbent material 28 to provide the best representation of the actual sorbent trap and/or sorbent material temperature. It is also understood, however, that in some embodiments the thermal sensing portion 60 may be spaced apart from the sorbent trap 14 and/or sorbent material 28 by greater distances, such as up to 50 cm or more, and still yield representative temperature measurements.

In exemplary embodiments, the temperature measurement device 18 and/or the thermal sensing portion 60 may be located downstream of an upstream edge 62 of the section of sorbent material 28 and/or generally downstream of the sorbent trap 14 to prevent contamination of the sorbent material, or deposition of the analyte on the temperature measurement device 18. In some embodiments, the placement of the thermal sensing portion 60 may be located directly downstream of the sorbent trap 14 and/or sorbent material 28 to provide close thermal contact without physical contact. The avoidance of physical contact with the sorbent trap 14 and/or sorbent material 28 may prevent interference with, or possibly invalidation of, the sorbent test sample. For example, as best shown in FIG. 2, when the sorbent trap insert 14 is in the installed position in the liner 36, the thermal sensing portion 60 (e.g., thermocouple junction) of the temperature measurement device 18 is located within the liner 36 at a position spaced apart from the downstream end 40 of the sorbent trap insert 14. It is understood, however, that in other embodiments the temperature measurement device (e.g., thermocouple) may contact the downstream end 40 of the sorbent trap 14 for providing even more accurate readings of the sorbent trap temperature. It is also understood that in some embodiments that use a temperature measurement device such as pyrometer, the thermal sensing portion 60 of the beam generated by the pyrometer may directly impinge the sorbent trap 14 and/or sorbent material 28 to directly measure the actual temperature of the trap and/or material.

As shown in the illustrated embodiment, the temperature measurement device 18 (e.g., thermocouple probe) may be inserted into the fluid passage 22 through a leak-tight fitting 64 that is operatively coupled to a downstream portion of the fluid conduit 30 and/or housing 20. This prevents the sample gas S from leaking out of the system prior to volume measurement by the sampling unit 16. Optionally, the leak-tight fitting 64 may be configured to permit adjustable positioning of the temperature measurement device 18 within the fluid passage 22. In addition, one or more spacers (not shown) may be provided in the fluid passage 22 to space the temperature measurement device (e.g., thermocouple probe) from the interior walls of the conduit 30. In the illustrated embodiment, the leak-tight fitting 64 includes a split connector, such as a T-connector, which allows insertion of the temperature measurement device 18 through one junction of the connector, while allowing the sample gas S to travel through a separate junction that is connected to a fluid conduit 66 for delivering the sample gas S to the sampling unit 16. It is understood that although a leak-tight split connector is shown in the illustrated embodiment, other suitable means for inserting and/or securing the temperature measurement device 18 to the probe 12 may be used, as would be understood by those having ordinary skill in the art.

As shown, the sampling unit 16 is operatively coupled to the probe 12 via one or more electrical channels 68 and/or fluid channels 66 for communicating with the probe 12. Generally, the sampling unit 16 may include a pump 70, one or more devices 72 for measuring one or more properties of the gas (e.g., volume), and a controller 74. It is understood that although only the general components of the sampling unit 16 are shown in the illustrated embodiment, the sampling system also may include one or more subsystems or subcomponents, such as desiccants, chillers, valve members, or the like, as would be understood by those having ordinary skill in the art.

The pump 70 is fluidly connected to the one or more fluid passages 22 of the probe 12 via the fluid conduits 66, and is configured to draw the gaseous sample S from the upstream inlet opening 24, through the sorbent trap 14 and across the sorbent material 28, and toward the sampling unit 16, where the measuring device 72 can then measure volume or other properties of the gaseous sample S. In exemplary embodiments, the volume measuring device may be a mass flow controller (MFC) or dry gas meter (DGM), for example.

The controller 74 is operatively coupled to the temperature measurement device 18, such as via the electrical line 68, for receiving a signal corresponding to the temperature measured within the fluid passage 22 by the thermal sensing portion 60 of the temperature measurement device 18. As discussed above, the measured temperature may be a temperature of the sample gas S proximate to the sorbent trap 14 and/or sorbent material 28, or may be an actual temperature of the sorbent trap 14 and/or sorbent material 28. Optionally, the measured temperature may be displayed via the sampling unit 16 using any suitable device, such as an LED or LCD display.

The controller 74 also is operatively coupled to the heater 50, such as via electrical line 69. The controller 74 is configured to control the heater 50 for controlling heating of the sorbent trap 14 and/or sorbent material 28. More particularly, the controller 74 may be configured to control heating of the sorbent trap 14 and/or sorbent material 28 via the heater 50 in response to receiving the signal that corresponds to the temperature measured by the thermal sensing portion 60 within the fluid passage 22. Alternatively or additionally, the controller 74 may be operatively coupled to the chiller 52 and may be configured to control cooling of the sorbent trap 14 and/or sorbent material 28 via the chiller (such as via fluid control valves, or the like). Similarly to the control of the heater 50, the chiller 52 may be controlled by the controller 74 in response to the temperature signal received from the thermal sensing portion 60 of the temperature measurement device 18.

By providing the temperature measurement from within the fluid passage 22, and preferably proximal to the sorbent trap 14 and/or sorbent material 28, a more accurate representation of the actual sorbent trap and/or sorbent material temperature may be utilized to control the desired heating and/or cooling via the heater 50 and/or chiller 52. More particularly, such an approach helps to minimize the effect of temperature gradients between the measurement location and the location of the sorbent trap and/or sorbent material. This is especially useful for sorbent trap techniques where a tight window of temperature control is required, such as when it is required to heat the sorbent material enough to enable efficient capture of the analyte of interest, but without overheating to cause melting or other damage to the sorbent material.

The exemplary sampling system 10 also may provide for independent heating and/or cooling control for each of the sorbent trap 14 within the probe 12. For example, where two or more sorbent traps 14 are utilized for multi-channel sampling, a respective two or more temperature measurement devices 18 may be configured to measure a temperature from within the fluid passage 22 of each fluid channel. In addition, each fluid passage 22, or fluid conduit 30, may have an independently associated heater 50 and/or chiller 52 (or independent zones of a single heater or single chiller). In this manner, each sorbent trap 14 in each fluid passage 22 may be independently heated and/or cooled based upon the independent temperature measured within the corresponding fluid passage.

It is understood that although preferred forms of the exemplary sampling system 10 and exemplary probe 12 have been described above, it should be apparent to those skilled in the art that other designs also could be used. The invention is not limited to any particular sampling system and/or probe design, but rather is appropriate for a wide variety of sampling system and/or probe designs.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. An "operable connection," or a connection by which entities are "operably connected," also is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

It is understood that embodiments of the subject matter described in this disclosure can be implemented in combination with digital electronic circuitry, controllers, processors, computer software, firmware, and/or hardware. For example, embodiments may be implemented in sampling system or sampling unit that uses one or more modules of computer program with instructions encoded on a non-transitory computer-readable medium for execution by, or to control the operation of, data processing apparatus. The operations may include physical manipulations of physical quantities. Usually, though not necessarily, the physical quantities take the form of electrical or magnetic signals capable of being stored, transferred, combined, compared, and otherwise manipulated in a logic and the like.

It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method. The computer-readable medium may be a hard-drive, a machine-readable storage device, a memory device, or a combination of one or more of the foregoing. The controller may include all apparatus, devices, and machines for processing data, including by way of example a programmable processor, a computer, or multiple processors or computers.

The controller may include, in addition to hardware, code that creates an execution environment for the computer program in question. The computer program (also referred to as software or code), may be deployed in any form, including as a stand-alone program or as a module, component, subroutine, or other unit suitable for use in a computing environment. The computer program may be deployed to be executed on one computer or on multiple computers that are located at one site or distributed across multiple sites and interconnected by a communication network. The processor may include all apparatus, devices, and machines suitable for the execution of a computer program, which may include, by way of example, both general and special purpose microprocessors, and any one or more processors of any kind of digital computer. Generally, the processor will receive instructions and data from a read-only memory or a random-access memory or both. The computer may include, or be operatively coupled to receive data from or transfer data to, or both, one or more mass storage devices for storing data. Devices suitable for storing computer program instructions and data include all forms of non-volatile memory, media and memory devices, including by way of example semiconductor memory devices. The processor and the memory can be supplemented by, or incorporated in, special purpose logic circuitry.

To provide for interaction with a user, embodiments may be implemented using a computer having a display device and an input device. Embodiments may include a computing system that includes a back-end component (e.g., as a data server), or that includes a middleware component (e.g., an application server), or that includes a front-end component (e.g., a client computer having a graphical user interface through which a user can interact with an implementation of the subject matter described is this specification), or any combination of one or more such back-end, middleware, or front-end components. The components of the system can be interconnected by any form or medium of digital data communication.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A probe for obtaining a gaseous sample from a gas stream, the probe comprising:
    a housing;
    a fluid passage extending through the housing between an upstream inlet opening for ingress of the gaseous sample from the gas stream into the fluid passage, and a downstream outlet opening for egress of the gaseous sample from the fluid passage;
    a sorbent material disposed within the fluid passage between the upstream inlet opening and the downstream outlet opening; and
    a temperature measurement device having a thermal sensing portion located within the fluid passage between the upstream inlet opening and the downstream outlet opening;
    wherein the temperature measurement device is configured to measure a temperature within the fluid passage via the thermal sensing portion;
    wherein the fluid passage is at least partially formed by a conduit extending through the housing; and
    wherein at least a portion of the conduit is configured as a multi-walled tube, the multi-walled tube having a radially inner portion that contains the sorbent material and a radially outer portion that jackets the radially inner portion along an axial length thereof.

2. The probe according to claim 1, wherein the thermal sensing portion is located downstream of an upstream edge of the sorbent material.

3. The probe according to claim 2, wherein the thermal sensing portion is in direct thermal contact with the gaseous stream proximate to the sorbent material.

4. The probe according to claim 1, wherein the thermal sensing portion is at a downstream portion of the sorbent material.

5. The probe according to claim 1, wherein the temperature measurement device is inserted into the conduit through a leak-tight fitting that is operatively coupled at a downstream portion of the housing.

6. The probe according to claim 1, wherein an upstream end portion of the conduit includes the upstream inlet opening of the fluid passage, the upstream end portion of the conduit extending outwardly from a front face of the housing such that the inlet opening is spaced from the front face of the housing and is configured for placement directly into the gas stream.

7. The probe according to claim 6, wherein the upstream end portion of the conduit is sealed against the front face of the housing with a compression fitting.

8. The probe according to claim 1, wherein the radially inner portion of the multi-walled tube is configured as a removable sorbent trap insert containing the sorbent material, and the radially outer portion of the multi-walled tube is configured as a liner coupled to the housing;
    wherein the sorbent trap insert is slidably inserted into an upstream portion of the liner when in an installed position, in which a downstream end of the sorbent trap insert terminates at a partial axial length of the liner such that the sorbent material is surrounded by the housing, and wherein the sorbent trap insert is configured to be removable from the liner and the probe; and
    wherein, when the sorbent trap insert is in the installed position in the liner, the thermal sensing portion of the temperature measurement device is located within the liner at a position downstream of the downstream end of the sorbent trap insert.

9. The probe according to claim 1,
    wherein the temperature measurement device is a thermocouple, and the thermal sensing portion is a thermal couple junction; or
    wherein the temperature measurement device is a pyrometer configured to generate a beam, and the thermal sensing portion is a surface upon which the beam impinges.

10. The probe according to claim 1, wherein the probe further comprises a heater in thermal communication with the sorbent material.

11. A probe for obtaining a gaseous sample from a gas stream, the probe comprising:
    a housing;
    a fluid passage extending through the housing between an upstream inlet opening for ingress of the gaseous sample from the gas stream into the fluid passage, and a downstream outlet opening for egress of the gaseous sample from the fluid passage;
    a sorbent material disposed within the fluid passage between the upstream inlet opening and the downstream outlet opening; and
    a temperature measurement device having a thermal sensing portion located within the fluid passage between the upstream inlet opening and the downstream outlet opening;
    wherein the temperature measurement device is configured to measure a temperature within the fluid passage via the thermal sensing portion; and
    wherein the probe further comprises a chiller in thermal communication with the sorbent material.

12. A sampling system comprising:
    the probe accord to claim 1; and
    a sampling unit operatively coupled to the fluid passage, the sampling unit being configured to measure at least one property of the gaseous sample.

13. The sampling system according to claim 12, wherein the sampling unit comprises a controller, and wherein the controller is operatively coupled to the temperature measurement device for receiving a signal corresponding to the measured temperature.

14. The sampling system according to claim 13,
    wherein the probe further comprises a heater in thermal communication with the sorbent material; and wherein the controller is operatively coupled to the heater and is configured to control heating via the heater based upon the signal corresponding to the measured temperature.

15. The sampling system according to claim 13,
wherein the probe further comprises a chiller in thermal communication with the sorbent material; and
wherein the controller is operatively coupled to the chiller and is configured to control cooling via the chiller based upon to the signal corresponding to the measured temperature.

16. The sampling system according to claim 13,
wherein the sampling unit further comprises a pump and a volume measuring device;
wherein the pump is fluidly connected to the fluid passage of the probe, and is configured to draw the gaseous sample from the upstream inlet opening, across the sorbent material, and toward the pump; and
wherein the volume measuring device is configured to measure a volume of the gaseous sample.

17. A sampling system for obtaining a gaseous sample from a gas stream, the sampling system comprising:
a probe having a housing with a sorbent trap at least partially disposed therein, the sorbent trap defining at least a portion of a fluid passage extending through the housing between an upstream inlet opening and a downstream outlet opening, the upstream inlet opening configured for ingress of the gaseous sample from the gas stream into the fluid passage, and the downstream outlet opening configured for egress of the gaseous sample from the fluid passage, wherein the sorbent trap includes a sorbent material disposed within the fluid passage between the upstream inlet opening and the downstream outlet opening;
a temperature measurement device having a thermal sensing portion located within the fluid passage, such that the temperature measurement device is configured to measure a temperature within the fluid passage;
a heater and/or a chiller in thermal communication with the sorbent material; and
a controller operatively coupled to the temperature measurement device and operatively coupled to the heater and/or chiller;
wherein the controller is configured to receive a signal from the temperature measurement device corresponding to the temperature measured within the fluid passage; and
wherein the controller is configured to control heating via the heater and/or control cooling via the chiller based upon the received signal.

18. The sampling system according to claim 17, wherein the sorbent trap is a first sorbent trap, the probe further having a second sorbent trap disposed in the housing.

19. The sampling system according to claim 17,
wherein the probe includes the heater in thermal communication with the sorbent material; and
wherein the controller is operatively coupled to the heater and is configured to control heating via the heater based upon the signal received from the temperature measurement device.

20. The sampling system according to claim 17,
wherein the probe includes the chiller in thermal communication with the sorbent material; and
wherein the controller is operatively coupled to the chiller and is configured to control cooling via the chiller based upon the signal received from the temperature measurement device.

* * * * *